United States Patent
Jorgensen

(10) Patent No.: US 10,935,059 B1
(45) Date of Patent: Mar. 2, 2021

(54) CRATE SPRING CLIP FASTENER

(71) Applicant: S.P.E.P. ACQUISITION CORP., Long Beach, CA (US)

(72) Inventor: Bret Jorgensen, Long Beach, CA (US)

(73) Assignee: S.P.E.P. ACQUISITION CORP., Long Beach, CA (US)

(*) Notice: Subject to any disclaimer, the term of this patent is extended or adjusted under 35 U.S.C. 154(b) by 0 days.

(21) Appl. No.: 16/654,451

(22) Filed: Oct. 16, 2019

(51) Int. Cl.
| | |
|---|---|
| F16B 5/06 | (2006.01) |
| B65D 6/02 | (2006.01) |
| B65D 6/36 | (2006.01) |
| B65D 6/14 | (2006.01) |

(52) U.S. Cl.
CPC .............. F16B 5/0614 (2013.01); B65D 9/06 (2013.01); B65D 9/30 (2013.01); B65D 9/38 (2013.01)

(58) Field of Classification Search
CPC .... B65D 9/06; B65D 9/30; B65D 9/38; F16B 5/0614
See application file for complete search history.

(56) References Cited

U.S. PATENT DOCUMENTS

| | | | | | |
|---|---|---|---|---|---|
| 2,006,657 | A | * | 7/1935 | Smith ..................... | B65D 45/18 292/288 |
| 3,082,897 | A | * | 3/1963 | Highley ................... | B65D 9/32 217/65 |
| 3,154,828 | A | * | 11/1964 | Bonde ..................... | B65D 9/32 217/65 |
| 3,323,674 | A | * | 6/1967 | Nist, Jr. .................... | B65D 9/24 217/12 R |
| 3,921,846 | A | * | 11/1975 | Mellott ..................... | B65D 9/24 217/65 |
| 4,024,977 | A | * | 5/1977 | Rowley .................... | B65D 9/24 217/12 R |
| 4,139,113 | A | * | 2/1979 | Graham, Jr. ............. | B65D 9/24 206/459.5 |
| 4,796,392 | A | * | 1/1989 | Graham, Jr. ........... | B65D 19/38 217/43 R |
| 6,203,235 | B1 | * | 3/2001 | Bonde ..................... | B65D 9/24 16/384 |
| 6,299,011 | B1 | * | 10/2001 | Rosenfeldt .............. | B65D 9/38 16/388 |
| 8,708,178 | B2 | * | 4/2014 | Kvols ..................... | B65D 19/16 220/4.33 |
| 8,813,985 | B2 | * | 8/2014 | Schloesser ............ | B65D 19/06 220/4.33 |

(Continued)

*Primary Examiner* — Robert Sandy
*Assistant Examiner* — David M Upchurch
(74) *Attorney, Agent, or Firm* — Karish & Bjorgum, PC

(57) ABSTRACT

A spring fastener clip for affixed crate panels together, which includes a pair of spaced apart panel bridging arms connected at a top to a pair of cleat bridging arms in the shape of a number 7. Extending downwardly from free ends of the cleat bridging arms first cleat end fingers, and extending between the first cleat end fingers is a bridge section. Extending forwardly of the bottom ends of the panel bridging arms are second cleat end fingers. An engagement pocket section extends rearwardly in the direction of the panel bridging arms and downwardly away from the cleat bridging arms. The engagement pocket section extends. The engagement pocket section provides an engagement for a prying tool that can be inserted into the engagement pocket when the spring fastener clip is in the process of and completely affixed to crate panels.

10 Claims, 9 Drawing Sheets

(56) References Cited

U.S. PATENT DOCUMENTS

| | | | |
|---|---|---|---|
| 10,165,874 B2* | 1/2019 | Bacallao | B65B 67/1233 |
| 2013/0067846 A1* | 3/2013 | Kvols | E04B 1/34315 |
| | | | 52/586.1 |

* cited by examiner

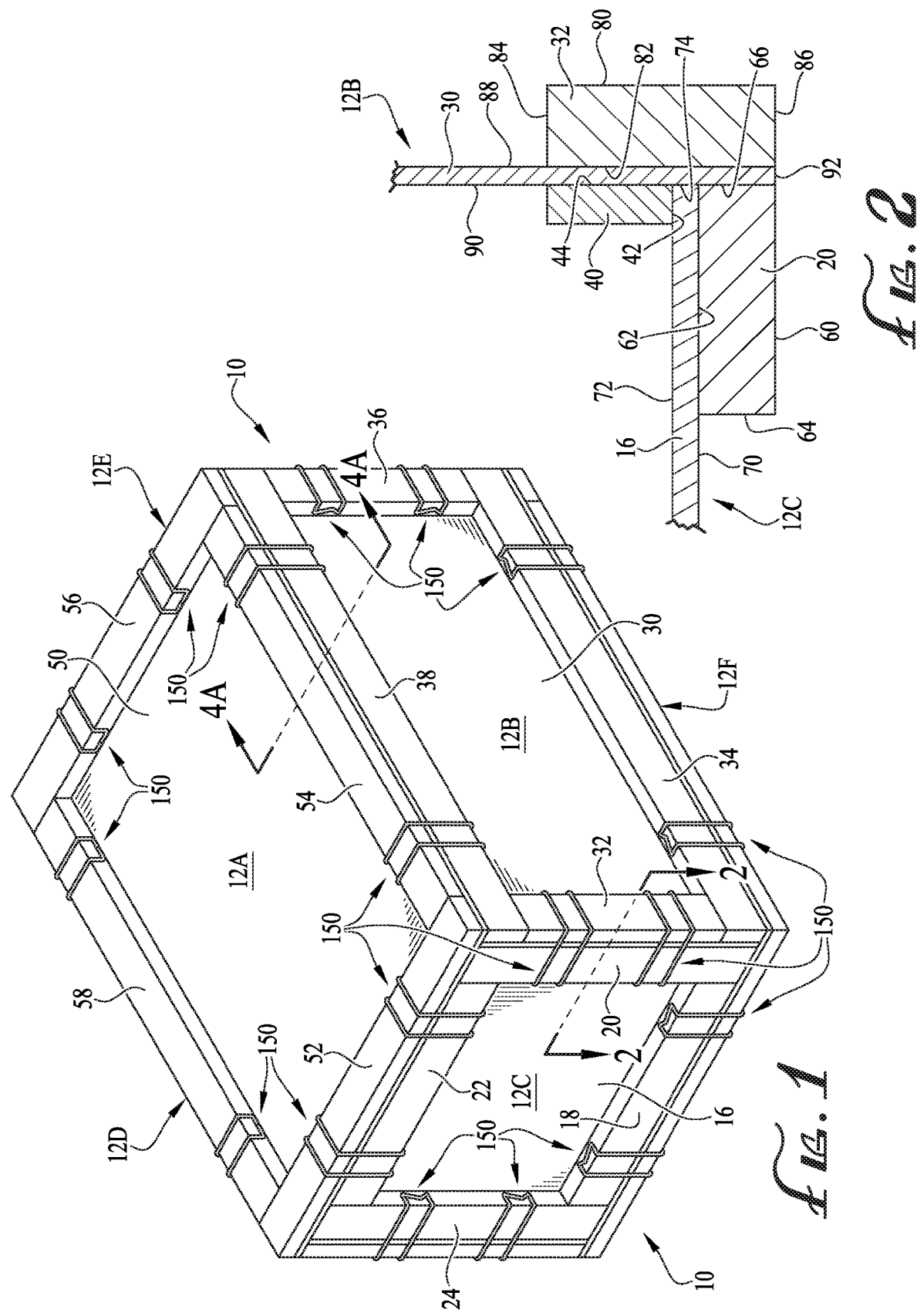

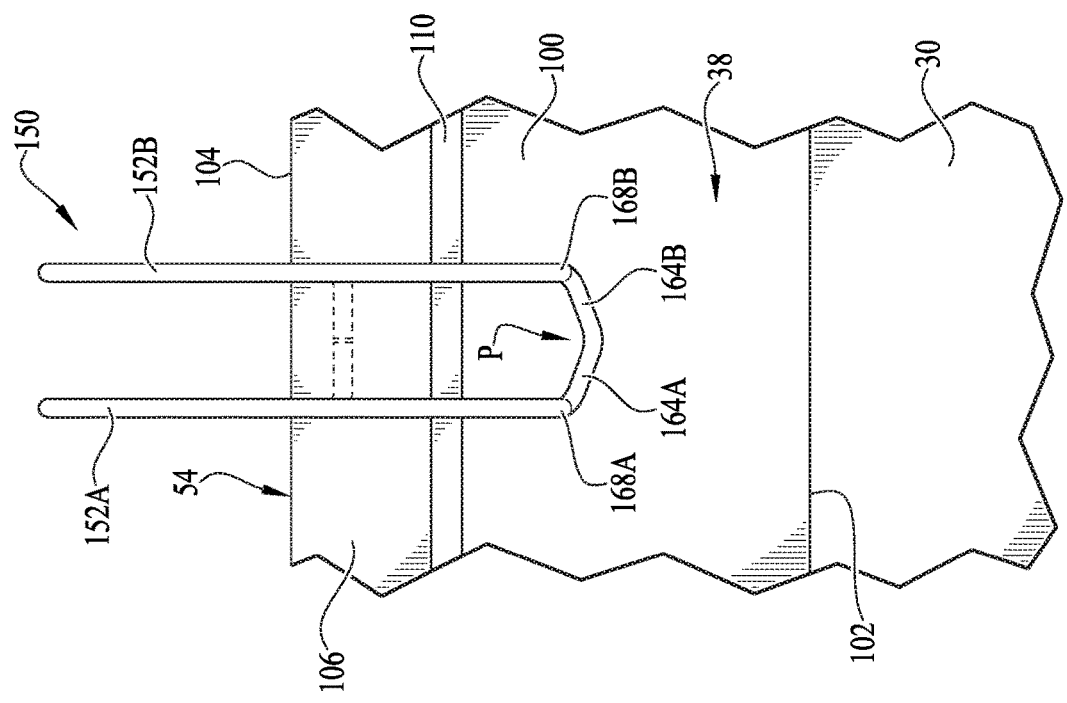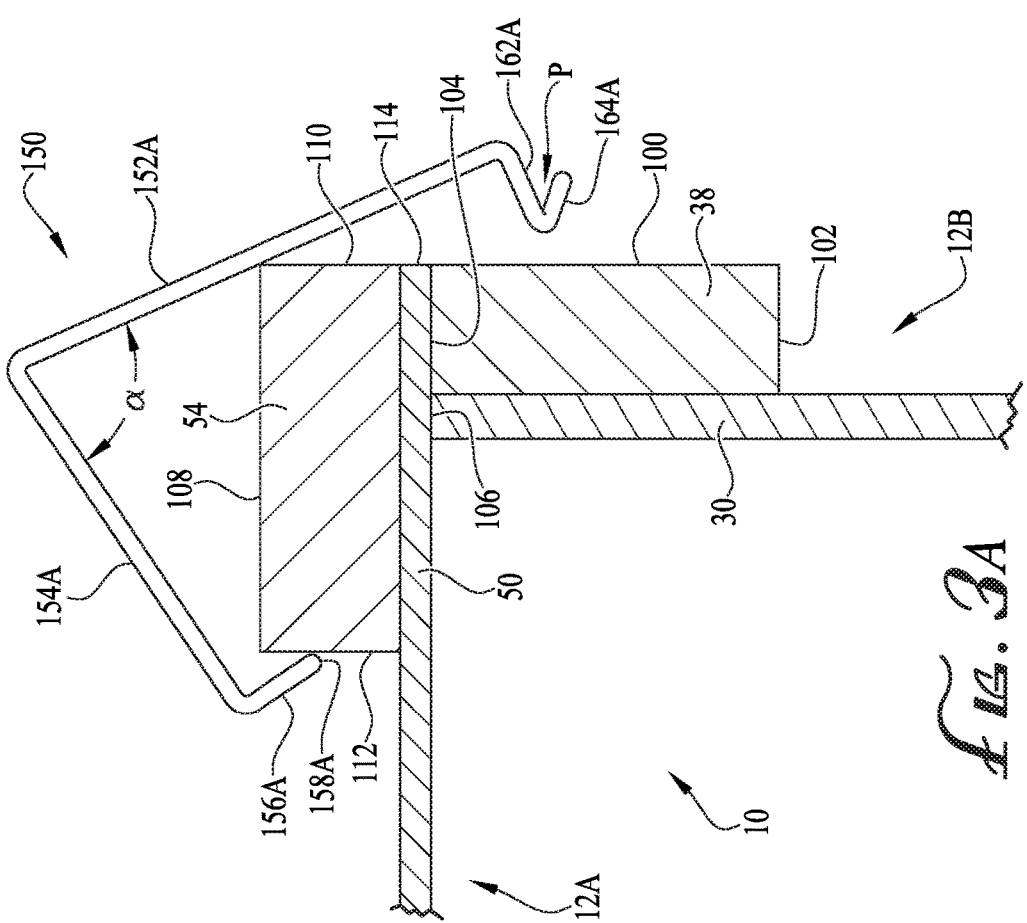

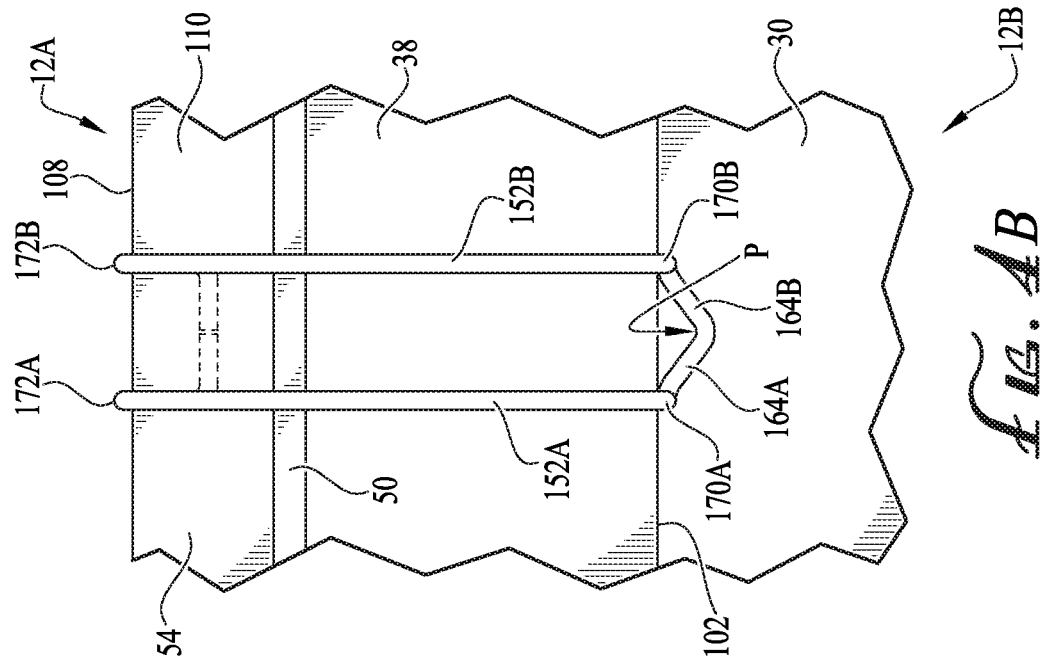
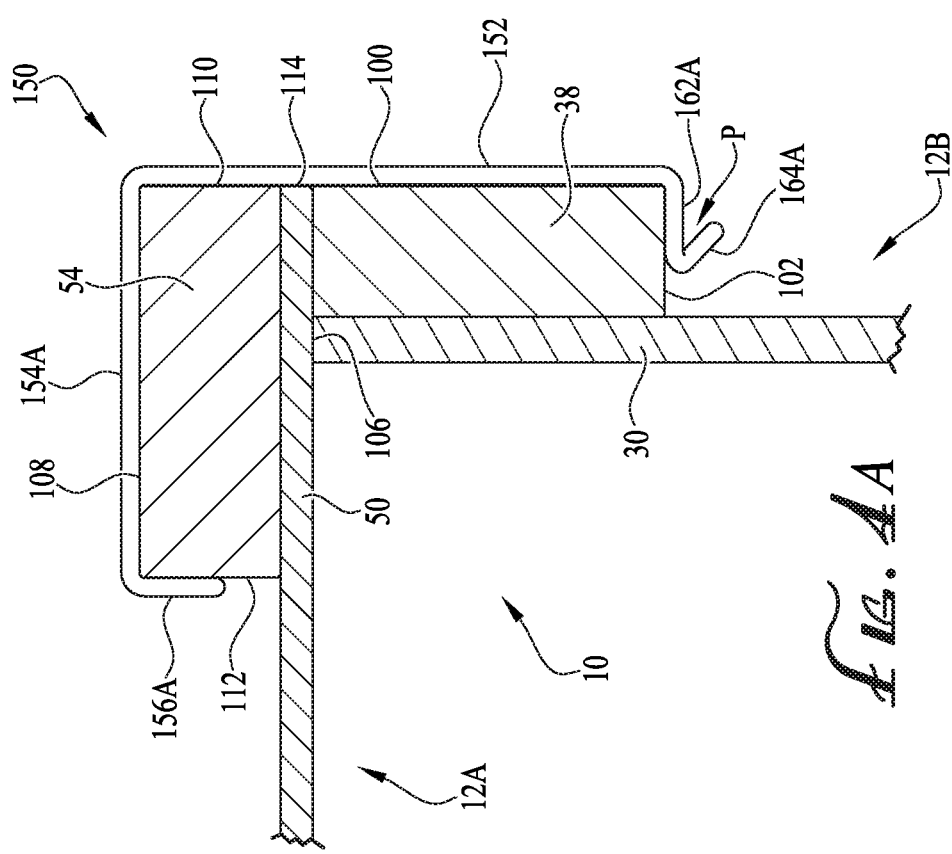

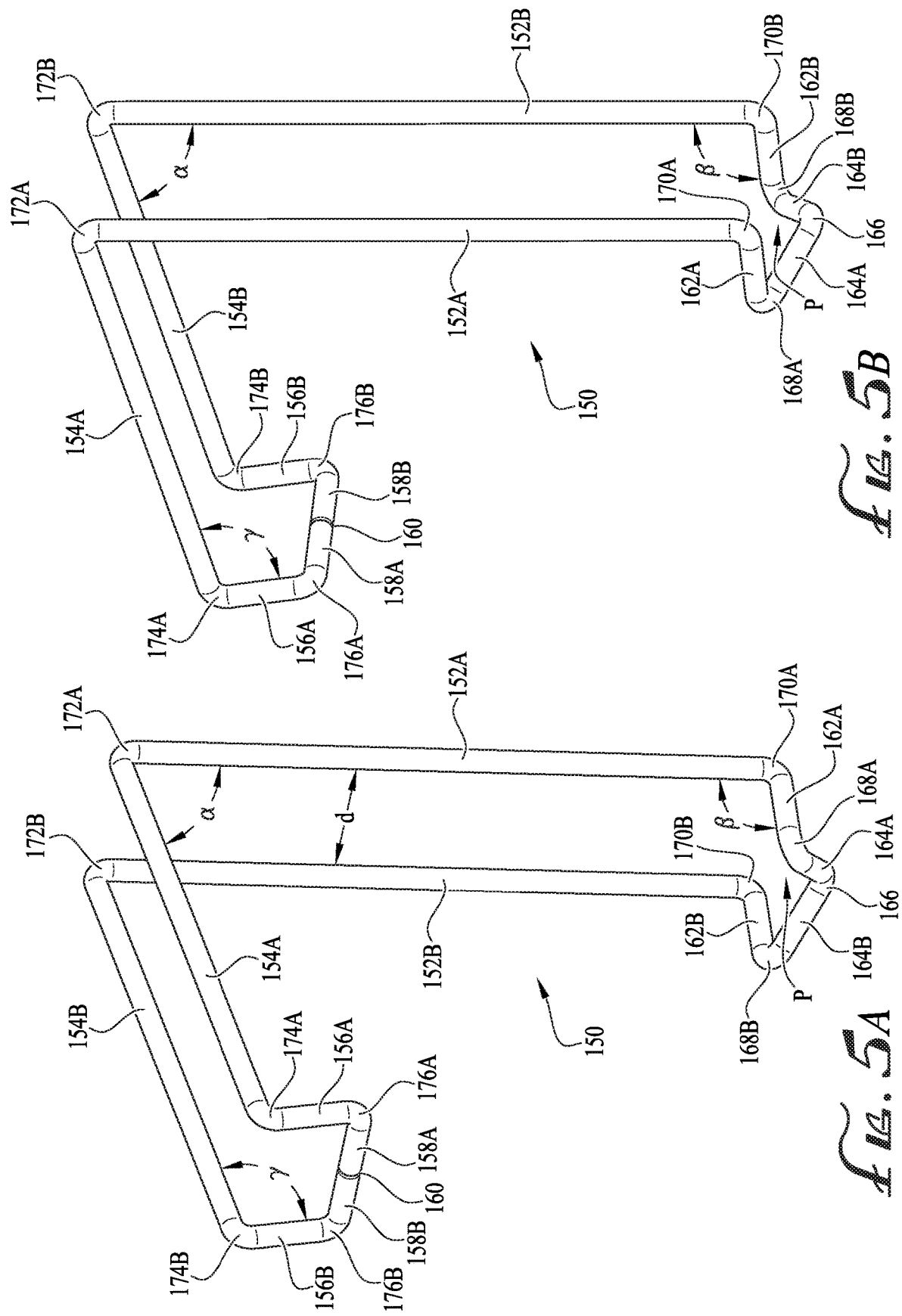

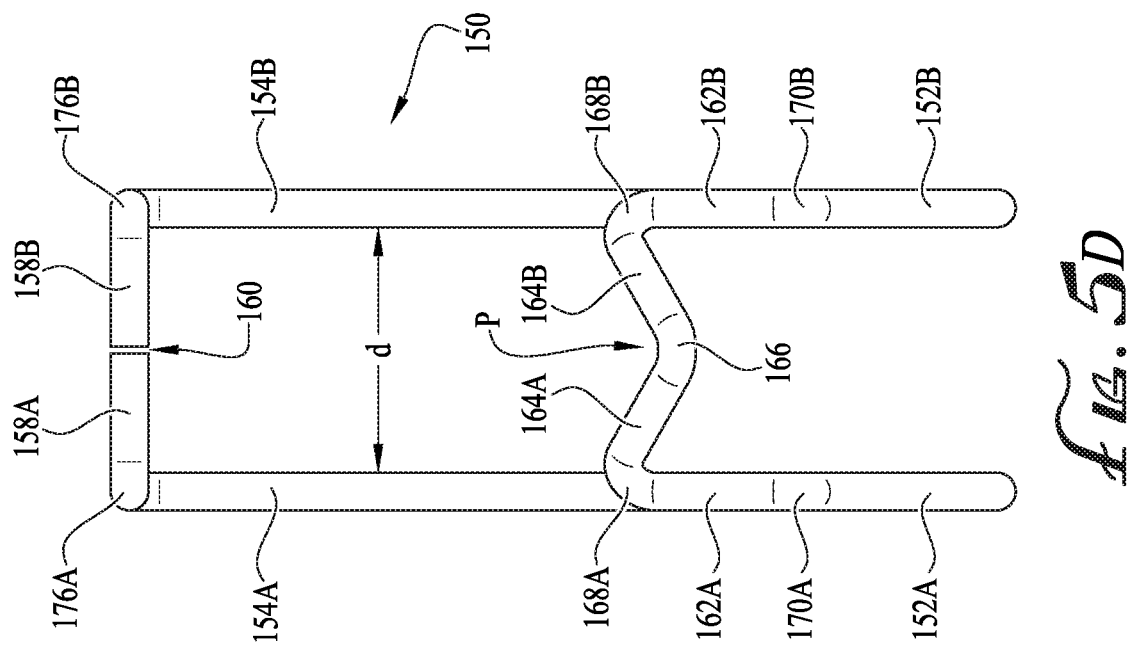
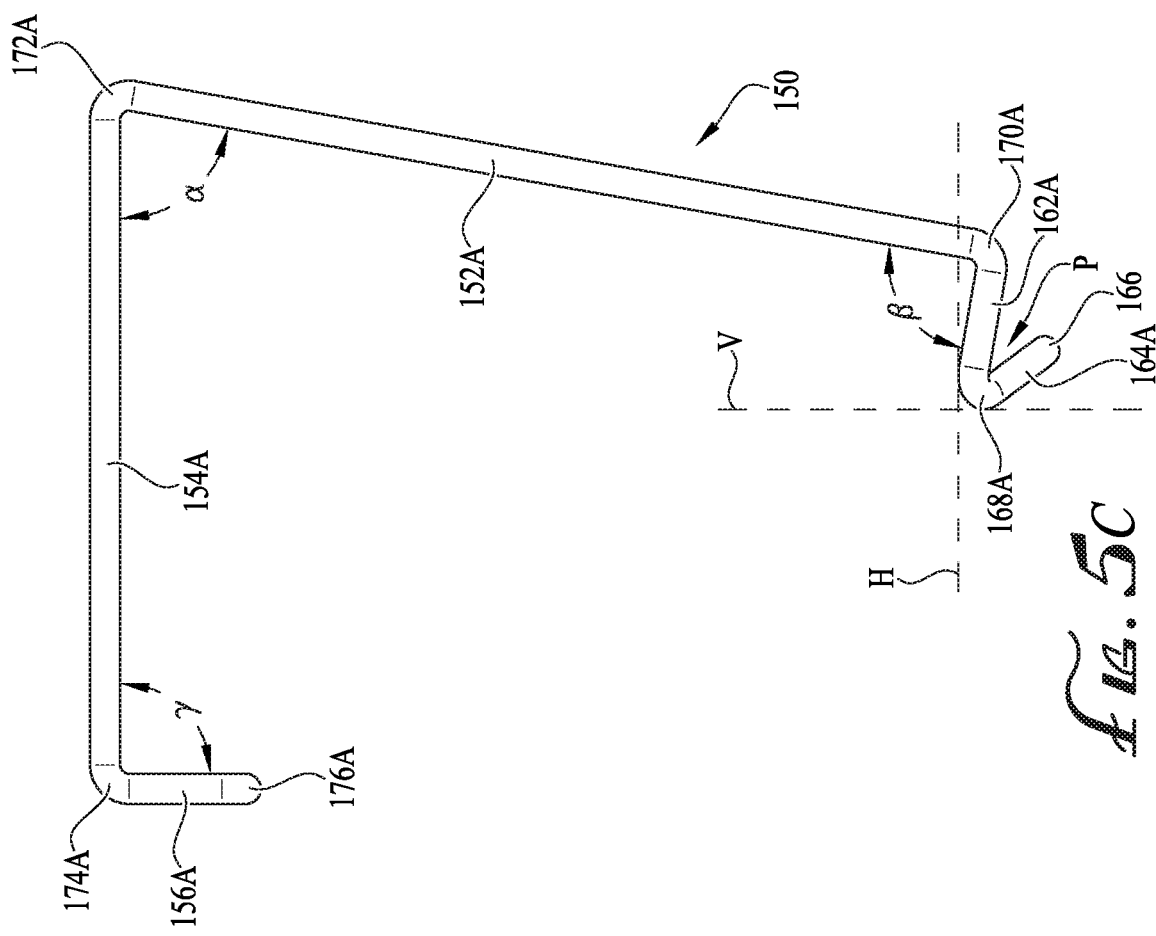

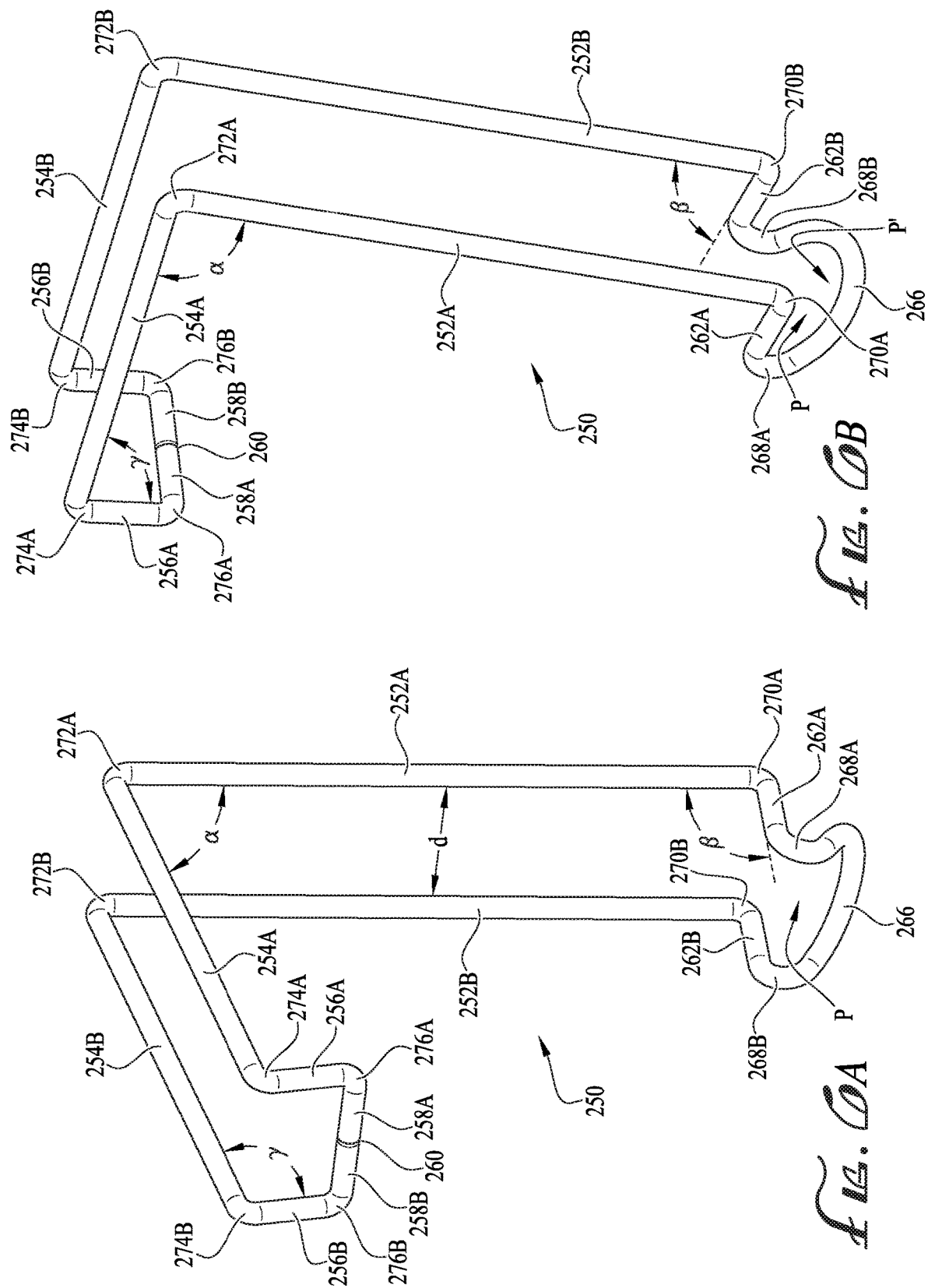

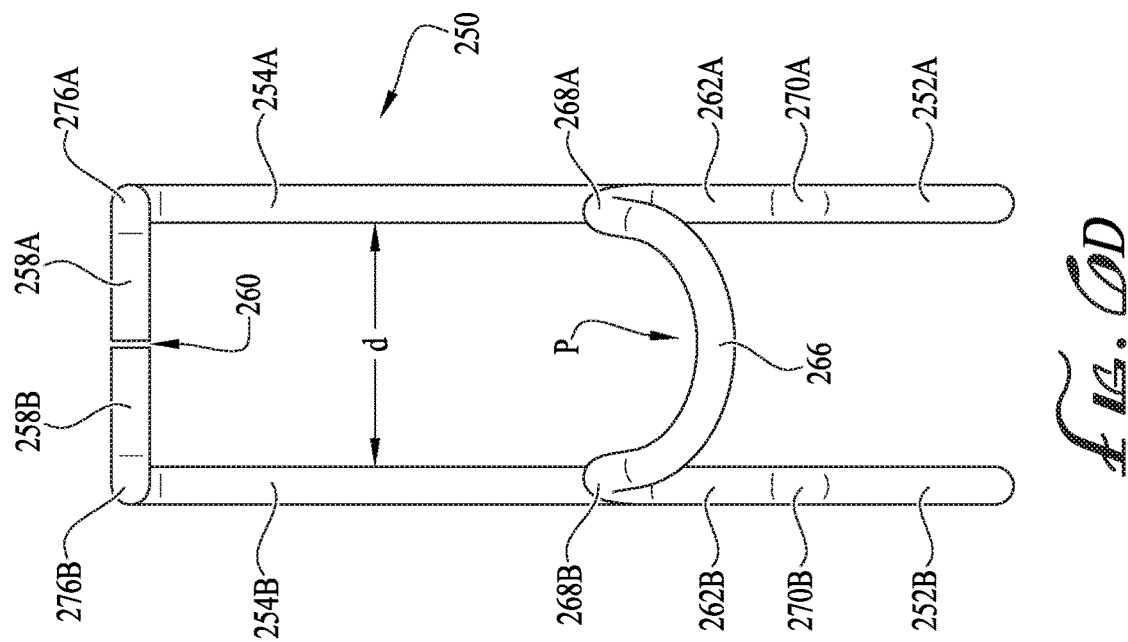
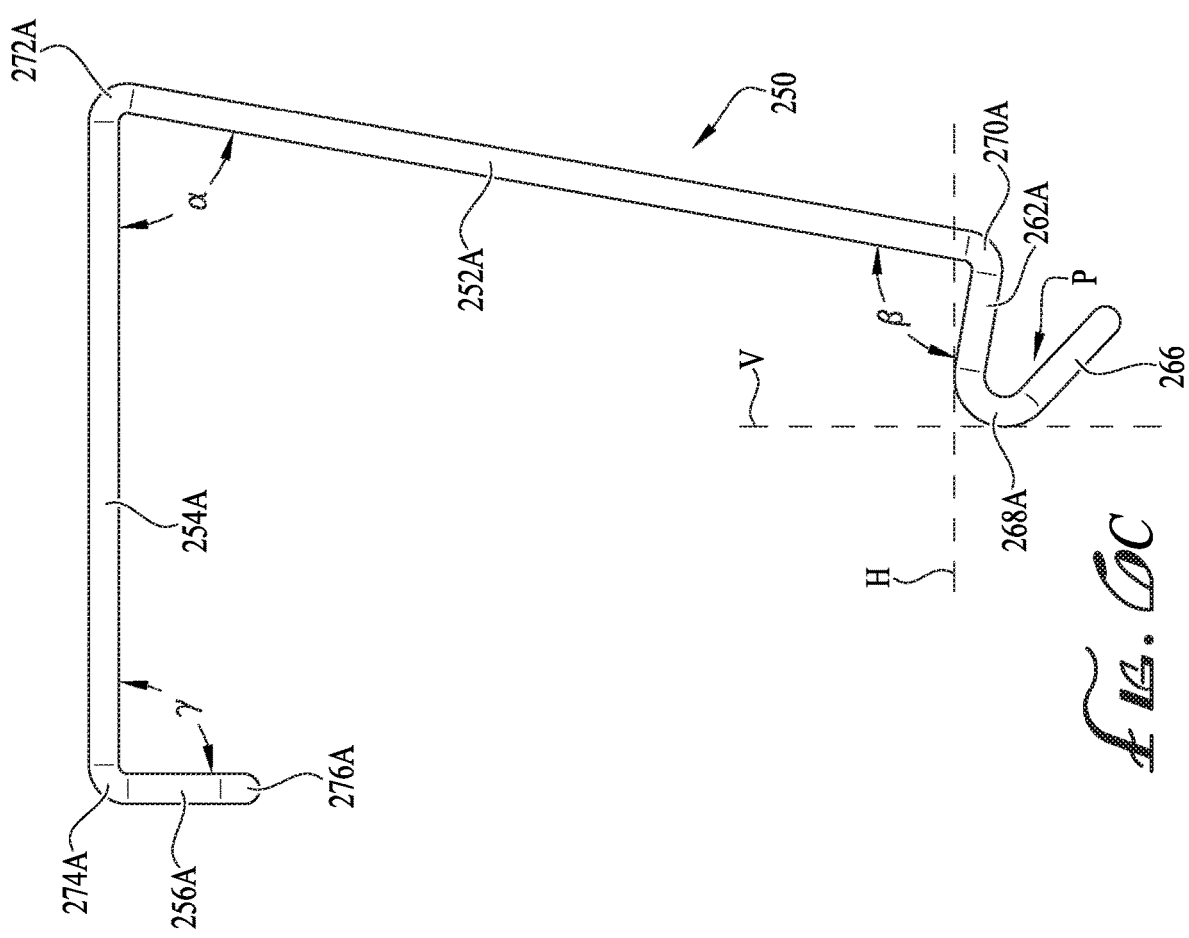

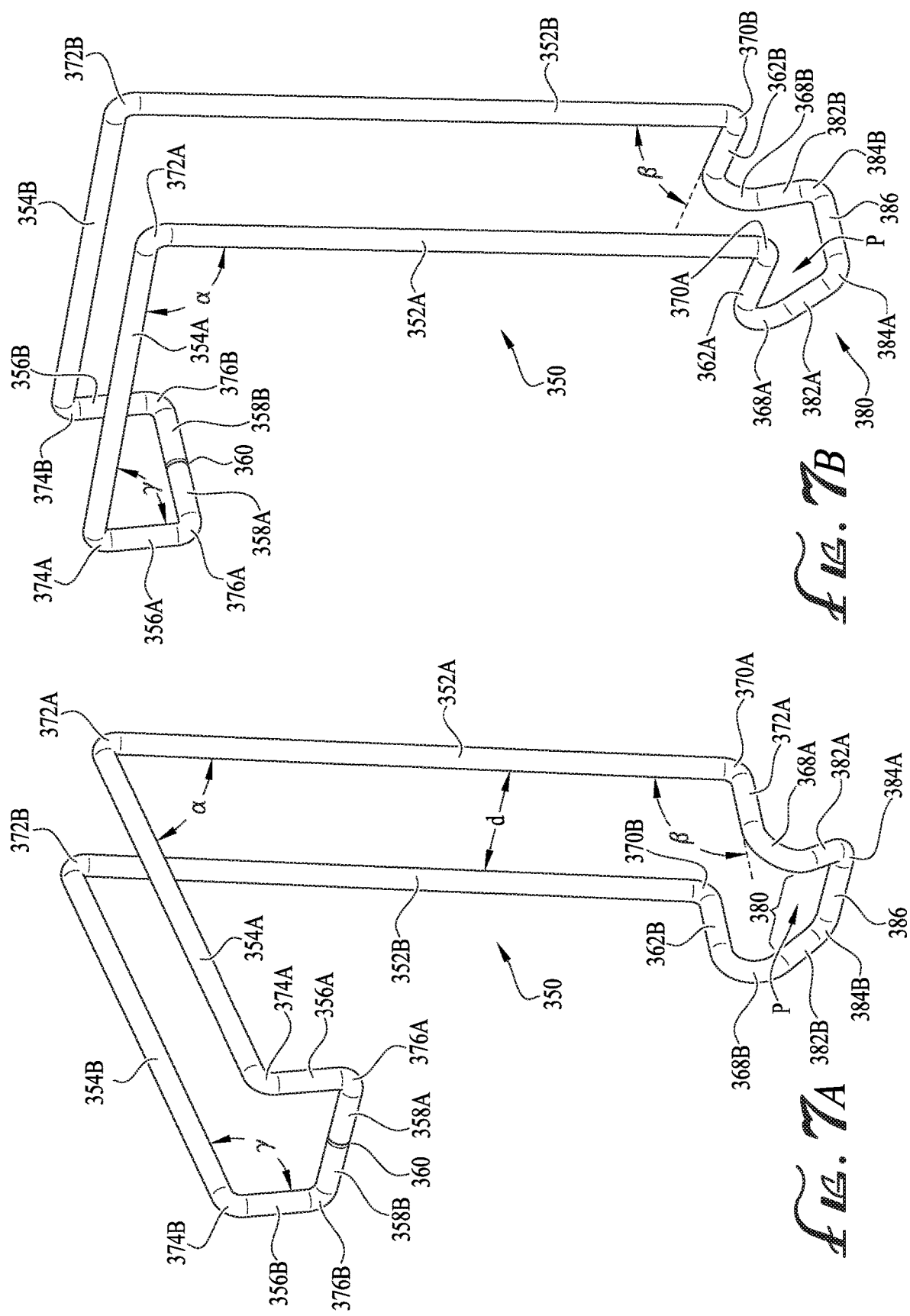

CRATE SPRING CLIP FASTENER

FIELD OF THE INVENTION

The invention relates to clip fasteners for use with crates and boxes in wide use for shipping and storage made up of panels of plywood or other materials to which are attached wooden cleats around the peripheral edges thereof, wherein the edges of the panels are held together with spring clip fasteners. More particularly, the spring clip fasteners of the invention include an easy attachment and removal feature which does not compromise the securement of the spring clips to the panels.

BACKGROUND OF THE INVENTION

U.S. Pat. No. 3,082,897 to Highley discloses two different embodiments of spring clip fasteners that can be used to hold together panels of plywood with peripheral wooden cleat to assemble a box, which clip fasteners can be removed to allow the box panels to be reused. Customarily the cleated panels are arranged to form a box, being held together by means of nails or staples passed through the plywood and cleats or adjacent panels, sometimes also with hinges and catches to form a door section. Among other problems with nailing the panels together to form a crate or box. Highley notes that nails can damage the panels, do not form strong boxes, take time to install, and impede the ability to easily open a box or crate to inspect the contents.

However, while the clip fasteners of Highley may be effective at holding box panels together once installed, they can be difficult to fit onto box panels and even more difficult remove once affixed. There accordingly remains a need for improved clip fasteners that both provide effective securement of box panels and also are quick and easy to install and remove.

SUMMARY OF THE INVENTION

The present invention is a spring fastener clip to affix crate panels together. The spring fastener clip comprises a pair of spaced apart wire wall sections, each section having a panel bridging arm with two ends, a cleat bridging arm extending at an angle less than 90 degrees from the first end of the panel bridging arm, a first cleat end finger extending at an angle from a free end of the cleat bridging arm, and second cleat end finger extending at an angle from the second end of the panel bridging arm; a bridge section extending between the pair of first cleat end fingers; and an engagement pocket section extending between ends of the pair of second cleat end fingers not connected to the panel bridging arms, which engagement pocket section at least partially extends rearwardly and downwardly from an imaginary vertical plane and horizontal plane that passes through the ends of the pair of second cleat end fingers, which engagement pocket provides an engagement for a prying tool that can be inserted into the engagement pocket when the spring fastener clip is in the process of and completely affixed to crate panels.

In another embodiment the invention provides a spring fastener clip for affixing crate panels together, the spring fastener clip formed of a single piece of bent spring wire, the spring fastener clip comprising a pair of spaced apart panel bridging arms, each having two ends, a pair of cleat bridging arms, each cleat bridging arm extending at an angle less than 90 degrees from a first end of each of the panel bridging arms, a pair of first cleat end fingers, each first cleat end finger extending at an angle from a free end of each of the cleat bridging arms, and a pair of second cleat end fingers, each second cleat end finger extending at an angle from the second ends of each of the panel bridging arms; a bridge section that extends between ends of pair of first cleat end fingers not extending from the cleat bridging arms; and an engagement pocket section that extends between ends of the pair of second cleat end fingers not connected to the panel bridging arms, which engagement pocket section at least partially extends rearwardly in the direction of the panel bridging arms and downwardly away from the cleat bridging arms, wherein the engagement pocket section provides an engagement for a prying tool that can be inserted into the engagement pocket when the spring fastener clip is in the process of and completely affixed to crate panels.

These and other features of the invention are described below.

BRIEF DESCRIPTION OF THE DRAWINGS

FIG. 1 is a perspective view of a box formed by securement of a series of box panels, with fastener clips of the invention.

FIG. 2 is a cross-sectional view through view lines 2-2 of FIG. 1 and shows the intersection of a first end panel and the front panel of the box.

FIG. 3A is a cross-sectional view through view lines 4A-4A of FIG. 1 and shows an exemplary embodiment of a fastener clip of the invention of FIGS. 5A-D in the process of being installed to secure two box panels together.

FIG. 3B is a front view showing fastener clip of the invention of FIGS. 5A-D in the process of being installed to secure two box panels together.

FIG. 4A is a cross-sectional view through view lines 4A-4A of FIG. 1 and shows an exemplary embodiment of a fastener clip of the invention fully installed to hold two box panels together.

FIG. 4B is a front view showing fastener clip of the invention of FIGS. 5A-D in the process after being fully installed to hold two box panels together.

FIG. 5A is a front right perspective view of a first embodiment of fastener clip of the invention.

FIG. 5B is a rear right perspective view of the first embodiment of fastener clip of the invention.

FIG. 5C is a right side view of the first embodiment of fastener clip of the invention.

FIG. 5D is a bottom view of the first embodiment of fastener clip of the invention.

FIG. 6A is a front right perspective view of a second embodiment of fastener clip of the invention.

FIG. 6B is a rear right perspective view of the second embodiment of fastener clip of the invention.

FIG. 6C is a right side view of the second embodiment of fastener clip of the invention.

FIG. 6D is a bottom view of the second embodiment of fastener clip of the invention.

FIG. 7A is a front right perspective view of a third embodiment of fastener clip of the invention.

FIG. 7B is a rear right perspective view of the third embodiment of fastener clip of the invention.

DETAILED DESCRIPTION

Figure 7D:
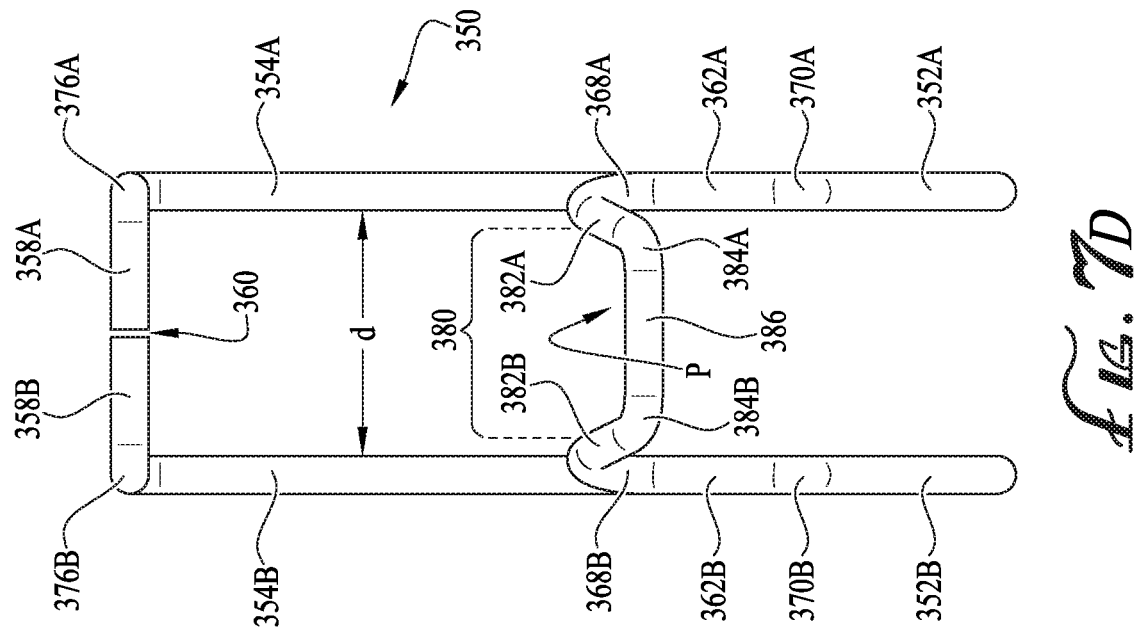
FIG. 7D is a bottom view of the third embodiment of fastener clip of the invention.

Turning first to FIG. 1 there is shown a perspective view of a box 10 formed by securement of a series of box panels, namely a top panel 12A, front panel 12B, a first end panel 12C, a rear panel 12D, a second end panel 12E, and a bottom panel 12F. An exemplary embodiment of fastener clips 150 of the invention are shown used to hold the panels 12A-F together. For example, the first end panel 12C is formed of a sheet of material 16 such as plywood or waferboard, and has wooden cleats 18, 20, 22, 24 attached around its perimeter. The front panel 12B has a sheet of material 30 with exterior cleats 32, 34, 36, and 38, and interior cleats 40 (see FIG. 2). Likewise, the top panel 12A has a sheet of material 50 with wooden cleats 52, 54, 56, 58 attached around its perimeter.

FIG. 2 is a cross-sectional view through view lines 2-2 of FIG. 1 and shows the intersection of a first end panel 12C and the front panel 12B of the box 10. The cleat 20 of the first end panel 12C has a top surface 60, a bottom surface 62, an inside edge 64 and an exterior edge 66. The panel 16 has an exterior edge 70 and an interior surface 72 and an external edge 74. The cleat 20 attached with its exterior surface 64 against the top surface 70 of the panel and with its exterior edge 66 flush with the external edge 74 of the panel 16. The cleat 20 attached with its exterior surface 64 against the top surface 70 of the panel and with its exterior surface 66 flush with the external edge 74 of the panel 16. The cleat 32 of the front panel 12B has a top surface 80, a bottom surface 82, an inside edge 84 and an exterior edge 86. The panel 30 has an exterior surface 88 and an interior surface 90 and an external edge 92. The interior cleat 40 of front panel 12B has an exterior edge 42 and a bottom surface 44, which interior cleat 40 is affixed to the interior surface 90 of the panel 30 and its external edge 42 is spaced away from the external edge 92 of the panel 30 a distance equal to the thickness of the panel 16 and thickness of cleat 20 of the first end panel 12C. Thus, when the first end panel 12C and front panel 12B are engaged together, the top surface 60 of end panel 12C will be flush with the external edge 92 and exterior edge 86 of the front panel 12B.

FIG. 3A is a cross-sectional view through view lines 4-4 of FIG. 1 and shows an exemplary embodiment of a fastener clip 150 of the invention of FIGS. 5A-D in the process of being installed to secure two box panels 12A and 12B together, and FIG. 3B is a front view of same. FIGS. 4A and 4B are similar to FIGS. 3A and 3B but show the fastener clip 150 as completely installed. Box panel 12B has a sheet of material 30 with a wooden cleat 38 attached thereto. The cleat 38 has a top surface 100, an inside edge 102, and an outside edge 104. The outside edge 104 of the cleat 38 is flush with a perimeter edge 106 of the sheet 30. Box panel 12A has a sheet of material 50 with a wooden cleat 54 attached thereto. The cleat 54 has a top surface 108, an outside edge 110, and an inside edge 112, and the cleat 54 has its outside edge 110 flush with a perimeter edge 114 of the sheet 50. When the box panels 12A and 12B are arranged, the top surface 100 of the cleat 38 of box panel 12B is flush with the outer perimeter edge 114 of the sheet 50 and the outside edge 110 of the cleat 54 of box panel 12A. The embodiment of fastener clip 150 will now be described with reference to FIGS. 5A-D.

In FIGS. 5A-D, there are shown respectively, a front right perspective view, a rear right perspective view, a right side view, and a bottom view of the first embodiment of fastener clip 150 of the invention. The fastener clip 150 can preferably formed of high strength spring steel wire or rod which is bent to the final shape during the manufacturing process. The fastener clip 150 has a pair of spaced apart panel bridging arms 152A and 152B. Continuing at upper bends 172A and 172B of the panel bridging arms 152A and 152B are a pair of spaced apart cleat bridging arms 154A and 154B. The spaced apart cleat bridging arms 154A and 154B are set off at an angle α relative to the panel bridging arms 152A and 152B, where angle α is less than 90 degrees and preferably between about 85 and 75 degrees, and more preferably about 80 degrees in the uninstalled state of the fastener clip 150. As formed, the panel bridging arms 152A and 152B and the cleat bridging arms 154A and 154B are laid out in the form of a number 7. Thus, when the fastener clip 150 is fully installed, the 80 degree angle α will stretch out to become the 90 degree angle of the corner of the crate and a spring force will be exerted by the spring fasteners 150 to secure together the box panels 12A and 12B. The cleat bridging arms 154A and 154B have a length that is matched to the width of the cleat 54 so that the cleat bridging arms 154A and 154B will snuggly ride on the outside surface 108 of the cleat 54, as shown in FIG. 4A. At distal bends 174A and 174B of cleat bridging arms 154A and 154B are first cleat end fingers 156A and 156B. The first cleat end fingers 156A and 156B are set off by an angle γ from the cleat bridging arms 154A and 154B, respectively. The angle γ can be around 90 degrees but can be somewhat less, e.g., 80 to 85 degrees, so that when the fastener clip 150 is installed, there is an additional spring force exerted on the cleats. The cleat end fingers 156A and 156B have a length that is preferably slightly less than a thickness of the cleat 54 so that the cleat bridging arms 154A and 154B will be able to fully ride on the outside surface 108 of the cleat 54 (see FIG. 4A). Indeed, the cleats 30 and 54 are typically made with widely available lumber such as nominal 1"×3" lumber, which has an actual size of ¾"×2½". Extending between distal bends 176A and 176B of the first cleat end fingers 156A and 156B are bridge pieces 158A and 158B, respectively. The bridge pieces 158A and 158B can extend straight across and between the bends 176A and 176B so that when the fastener clip 150 is fully installed, the bridge pieces 158A and 158B will ride flat against the inner edge 112 of the cleat 54. The bridge pieces 158A and 158B can be separated by a break 160 located where the two ends of the single piece of spring wire forming the fastener clip 150 intersect. Continuing from lower bends 170A and 170B of the panel bridging arms 152A and 152B are a pair of second cleat end fingers 168A and 168B, respectively. The second cleat end fingers 168A and 168B are set off by an angle ß from the panel bridging arms 152A and 152B, respectively. The angle ß can be around 90 degrees but can be somewhat less, e.g., 80 to 88 degrees, so that when the fastener clip 150 is installed, there is an additional spring force exerted on the cleats. The parallel wire sections are comprised of first cleat edge fingers 156A and 156B, cleat bridging arms 154A and 154B, panel bridging arms 152A and 152B, and second cleat end fingers 162A and 162B, respectively, and preferably lie on parallel planes and can have their respective wire sections spaced apart equally. So far, the fastener clip 150 as described is similar to the fastener clips of U.S. Pat. No. 3,082,897 to Highley. What makes the fastener clip 150 of the invention unique and a big improvement are its second cleat end fingers bridging sections 164A and 164B. Rather than extending straight across between bends 168A and 168B of the second cleat end fingers 162A and 162B, respectively, each of the second cleat end fingers bridging sections 164A and 164B are angled down and out from their bends 168A and 168B and away from a horizontal plane H and a vertical plane V, respectively, and intersect at a generally V-shaped bend 166. As shown in FIGS. 4A and 4B, the thusly embodied V-shaped second cleat end fingers bridging sections 164A and 164B provide an engagement pocket P underneath and extending away the inner edge 102 of the cleat 38 and the panel 30. This engagement pocket P is available for a user of the fastener clips 150 to insert a prying tool, such as the end of a flat end screwdriver, to pull down the second cleat end fingers 162A and 162B of the fastener clips 150 as its goes from partially installed state of FIGS. 3A and 3B, to the completely installed state of FIGS. 4A and 4B, where the cleat end fingers 162A and 162B will bear against the inner edge 102 of the cleat 38 of the panel 12B, while the second cleat end fingers bridging sections 164A and 164B provide an engagement pocket P underneath and extending away the inner edge 102 of the cleat 38 and the panel 30. Although a flat end screwdriver or other prying device can be used to help install a conventional fastener clip of the prior art, such prior art fastener clips do not provide any sort prying tools engagements as their bridge pieces are flat and ride on inner edges of their respectively installed cleats, in the same manner that the bridge pieces 158A and 158B of the present fastener clip 150 ride on the inner edge 112 of the cleat 54 without any prying tool engagements being created. Thus, with current fastener clips, users often struggle to grasp a pulling end of the fastener clip when installing it on box panels. This problem is compounded further when a user wishes to remove fastener clip, because when current fastener clips are fully installed, there is no prying tools engagements that will allow a user to reliably engage a prying tool to remove the clip in a slip free manner. Indeed, even if a prying tool can be engaged to remove a tool, sometimes the prying tool slips off the fastener clip and the fastener clip goes flying. Since the fastener clips can be under quite a bit of tension, flying fastener clips can be a problem. Also, users sometimes need to resort to digging the prying tool into the material of the cleats in order to get under the fastener clip to allow for installation and removal. This takes additional time and effort. In contrast with these problems associated with prior art fastener clips, the fastener clip 150 of the invention will allow reliable and safe installation and removal of the fastener clips 150.

Turning next to FIGS. 6A-D, there are shown respectively, a front right perspective view, a rear right perspective view, a right side view, and a bottom view of the second exemplary embodiment of fastener clip 250 of the invention. The fastener clip 250, like the fastener clip 150 of FIGS. 5A-D can preferably formed of high strength spring steel wire or rod which is bent to the final shape during the manufacturing process. Like the fastener clip 250 of FIGS. 5A-D, fastener clip 250 has a pair of spaced apart panel bridging arms 252A and 252B. Continuing at upper bends 272A and 272B of the panel bridging arms 252A and 252B are a pair of spaced apart cleat bridging arms 254A and 254B. The spaced apart cleat bridging arms 254A and 254B are set off at an angle α relative to the panel bridging arms 252A and 252B, where angle α is less than 90 degrees and preferably between about 85 and 75 degrees, and more preferably about 80 degrees in the uninstalled state of the fastener clip 250. Thus, when the fastener clip 250 is fully installed, the 80 degree angle α will stretch out to become the 90 degree angle of the corner of the crate and a spring force will be exerted by the spring fasteners 250 to secure together the box panels 12A and 12B (not shown). At distal bends 274A and 274B of cleat bridging arms 254A and 254B are first cleat end fingers 256A and 256B. The first cleat end fingers 256A and 256B are set off by an angle γ from the cleat bridging arms 254A and 254B, respectively. The angle γ can be around 90 degrees but can be somewhat less, e.g., 80 to 85 degrees, so that when the fastener clip 250 is installed, there is an additional spring force exerted on the cleats. The cleat end fingers 256A and 256B have a length that is preferably slightly less than a thickness of the cleat 54 so that the cleat bridging arms 254A and 254B will be able to fully ride on the outside surface 108 of the cleat 54 (in the same manner as the fastener clip 150 of FIG. 4A). Extending between distal bends 276A and 276B of the first cleat end fingers 256A and 256B are bridge pieces 258A and 258B, respectively. The bridge pieces 258A and 258B can extend straight across and between the bends 276A and 276B so that when the fastener clip 250 is fully installed, the bridge pieces 258A and 258B will ride flat against the inner edge 112 of the cleat 54. The bridge pieces 258A and 258B can be separated by a break 260 located where the two ends of the single piece of spring wire forming the fastener clip 250 intersect. Continuing from lower bends 270A and 270B of the panel bridging arms 252A and 252B are a pair of second cleat end fingers 268A and 268B, respectively. The second cleat end fingers 268A and 268B are set off by an angle ß from the panel bridging arms 252A and 252B, respectively. The angle ß can be around 90 degrees but can be somewhat less, e.g., 80 to 88 degrees, so that when the fastener clip 250 is installed, there is an additional spring force exerted on the cleats. The parallel wire sections are comprised of first cleat edge fingers 256A and 256B, cleat bridging arms 254A and 254B, panel bridging arms 252A and 252B, and second cleat end fingers 262A and 262B, respectively, and preferably lie on parallel planes and can have their respective wire sections spaced apart equally by distance "d". So far, the fastener clip 250 as described is the same as fastener clip 150 of FIGS. 5A-D. What differentiates the fastener clip 250 from fastener clip 150 is that instead of having second cleat end fingers bridging sections that are in the shape of a V, a single semi-circular extending loop section 266 is located between the bends 268A and 268B. The single semi-circular extending loop section 266 is angled down and out from their bends 268A and 268B and away from a horizontal plane H and a vertical plane V, respectively. As with the embodiment of the fastener clip 150 shown in FIGS. 4A and 4B, the thusly embodied single semi-circular extending loop section 266 provides an engagement pocket P underneath and extending away the inner edge 102 of the cleat 38 and the panel 30. This engagement pocket P is available for a user of the fastener clips 250 to insert a prying tool, such as the end of a flat end screwdriver, to pull down the second cleat end fingers 262A and 262B of the fastener clips 250 as its goes from partially installed state of FIGS. 3A and 3B, to the completely installed state of FIGS. 4A and 4B, where the cleat end fingers 262A and 262B will bear against the inner edge 102 of the cleat 38 of the panel 12B, while the single semi-circular extending loop section 266 provides an engagement pocket P underneath and extending away the inner edge 102 of the cleat 38 and the panel 30. Although a flat end screwdriver or other prying device can be used to help install a conventional fastener clip of the prior art, such prior art fastener clips do not provide any sort of prying tools engagements as their bridge pieces are flat and ride on inner edges of their respectively installed cleats, in the same manner that the bridge pieces 258A and 258B of the present fastener clip 250 ride on the inner edge 112 of the cleat 54 without any prying tool engagements being created. Thus, with current fastener clips, users often struggle to grasp a pulling end of the fastener clip when installing it on box panels. This problem is compounded further when a user wishes to remove the fastener clip, because when current fastener clips are fully installed, there is no prying tools engagements that will allow a user to reliably engage a prying tool to remove the clip in a slip free manner. Indeed, even if a prying tool can be engaged to remove a tool, sometimes the prying tool slips off the fastener clip and the fastener clip goes flying. Since the fastener clips can be under quite a bit of tension, flying fastener clips can be a problem. Also, users sometimes need to resort to digging the prying tool into the material of the cleats in order to get under the fastener clip to allow for installation and removal. This takes additional time and effort. In contrast with these problems associated with prior art fastener clips, the fastener clip 250 of the invention will allow reliable and safe installation and removal of the fastener clips 250.

Figure 7C:
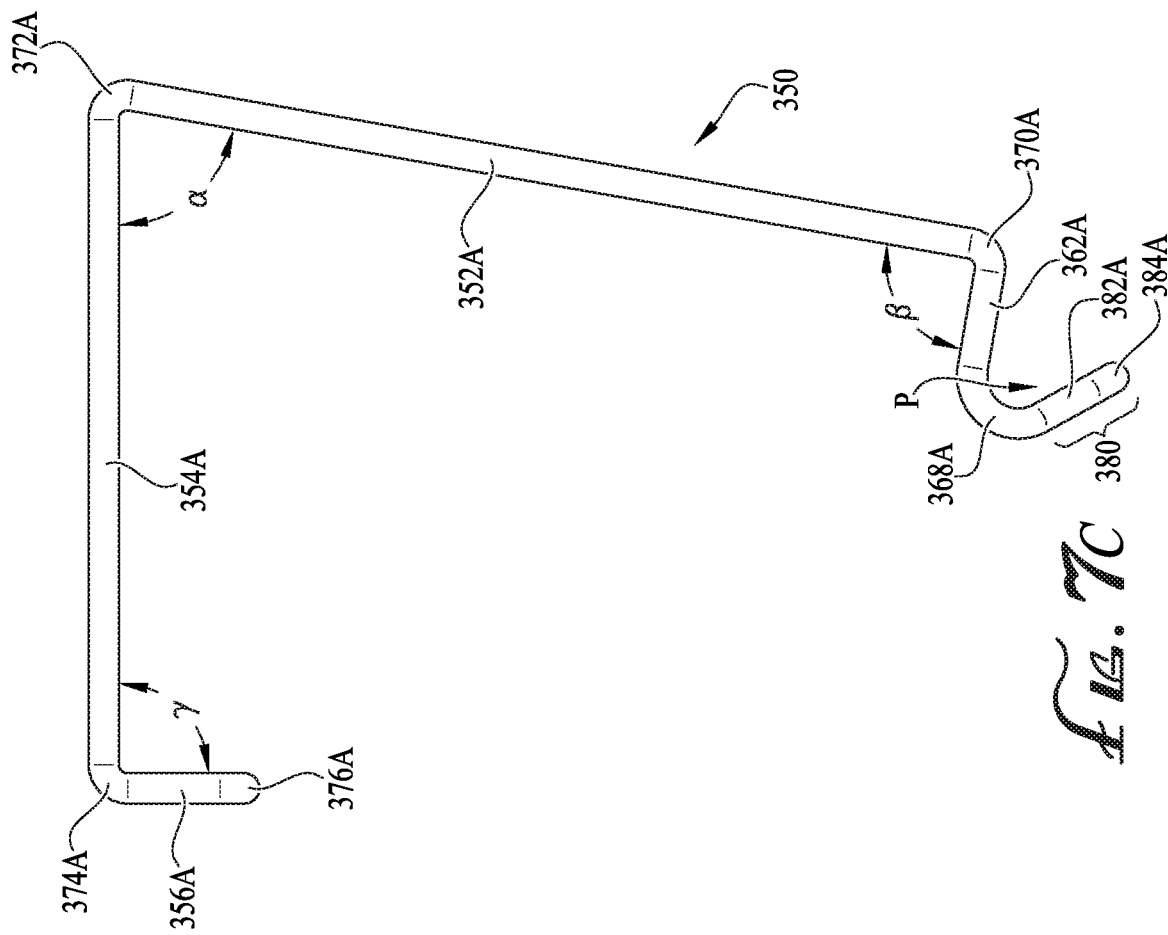
FIG. 7C is a right side view of the third embodiment of fastener clip of the invention.

Turning lastly to FIGS. 7A-D, there are shown respectively, a front right perspective view, a rear right perspective view, a right side view, and a bottom view of the third exemplary embodiment of fastener clip 350 of the invention. The fastener clip 350, like the fastener clip 150 of FIGS. 5A-D and 250 of FIGS. 6A-D, can be preferably formed of high strength spring steel wire or rod which is bent to the final shape during the manufacturing process. Like the fastener clip 150 of FIGS. 5A-D, fastener clip 350 has a pair of spaced apart panel bridging arms 352A and 352B. Continuing at upper bends 372A and 372B of the panel bridging arms 352A and 352B are a pair of spaced apart cleat bridging arms 354A and 354B. The spaced apart cleat bridging arms 354A and 354B are set off at an angle α relative to the panel bridging arms 352A and 352B, where angle α is less than 90 degrees and preferably between about 85 and 75 degrees, and more preferably about 80 degrees in the uninstalled state of the fastener clip 350. Thus, when the fastener clip 350 is fully installed, the 80 degree angle α will stretch out to become the 90 degree angle of the corner of the crate and a spring force will be exerted by the spring fasteners 350 to secure together the box panels 12A and 12B (not shown). At distal bends 374A and 374B of cleat bridging arms 354A and 354B are first cleat end fingers 356A and 356B. The first cleat end fingers 356A and 356B are set off by an angle γ from the cleat bridging arms 354A and 354B, respectively. The angle γ can be around 90 degrees but can be somewhat less, e.g., 80 to 85 degrees, so that when the fastener clip 350 is installed, there is an additional spring force exerted on the cleats. The cleat end fingers 356A and 356B have a length that is preferably slightly less than a thickness of the cleat 54 so that the cleat bridging arms 354A and 354B will be able to fully ride on the outside surface 108 of the cleat 54 (in the same manner as the fastener clip 150 of FIG. 4A). Extending between distal bends 376A and 376B of the first cleat end fingers 356A and 356B are bridge pieces 358A and 358B, respectively. The bridge pieces 358A and 358B can extend straight across and between the bends 376A and 376B so that when the fastener clip 350 is fully installed, the bridge pieces 358A and 358B will ride flat against the inner edge 112 of the cleat 54, in the same manner as the fastener clip 150. The bridge pieces 358A and 358B can be separated by a break 360 located where the two ends of the single piece of spring wire forming the fastener clip 350 intersect. Continuing from lower bends 370A and 370B of the panel bridging arms 352A and 352B are a pair of second cleat end fingers 368A and 368B, respectively. The second cleat end fingers 362A and 362B are set off by an angle ß from the panel bridging arms 352A and 352B, respectively. The angle ß can be around 90 degrees but can be somewhat less, e.g., 80 to 88 degrees, so that when the fastener clip 350 is installed, there is an additional spring force exerted on the cleats. The parallel wire sections are comprised of first cleat edge fingers 356A and 356B, cleat bridging arms 354A and 354B, panel bridging arms 352A and 352B, and second cleat end fingers 362A and 362B, respectively, and preferably lie on parallel planes and can have their respective wire sections spaced apart equally by distance "d". So far, the fastener clip 350 as described is the same as fastener clip 150 of FIGS. 5A-D and fastener clip 250 of FIGS. 6A-D. What differentiates the fastener clip 350 from fastener clip 150 is that instead of having second cleat end fingers bridging sections that are in the shape of a V, a rectangular extending loop section 380 is located between the bends 368A and 368B. The rectangular extending loop section 380 includes straight sections 382A and 382B that extend from the bends 368A and 368B. Spanning distal ending bends 384A and 384B of the straight sections 382A and 382B is a catch bar 386. As with the embodiment of the fastener clip 150 shown in FIGS. 4A and 4B, the thusly embodied rectangular extending loop section 380 provides an engagement pocket P underneath and extending away the inner edge 102 of the cleat 38 and the panel 30 (not shown.) This engagement pocket P is available for a user of the fastener clips 350 to insert a prying tool, such as the end of a flat end screwdriver, to pull down the second cleat end fingers 362A and 362B of the fastener clips 350 as its goes from partially installed state of FIGS. 3A and 3B, to the completely installed state of FIGS. 4A and 4B, where the cleat end fingers 362A and 362B will bear against the inner edge 102 of the cleat 38 of the panel 12B, while the rectangular extending loop section 380 provides an engagement pocket P underneath and extending away the inner edge 102 of the cleat 38 and the panel 30. Although a flat end screwdriver or other prying device can be used to help install a conventional fastener clip of the prior art, such prior art fastener clips do not provide any sort prying tools engagements as their bridge pieces are flat and ride on inner edges of their respectively installed cleats, in the same manner that the bridge pieces 358A and 358B of the present fastener clip 350 ride on the inner edge 112 of the cleat 54 without any prying tool engagements being created. Thus, with current fastener clips, users often struggle to grasp a pulling end of the fastener clip when installing it on box panels. This problem is compounded further when a user wishes to remove fastener clip, because when current fastener clips are fully installed, there is no prying tools engagements that will allow a user to reliably engage a prying tool to remove the clip in a slip free manner. Indeed, even if a prying tool can be engaged to remove a tool, sometimes the prying tool slips off the fastener clip and the fastener clip goes flying. Since the fastener clips can be under quite a bit of tension, flying fastener clips can be a problem. Also, users sometimes need to resort to digging the prying tool into the material of the cleats in order to get under the fastener clip to allow for installation and removal. This takes additional time and effort. In contrast with these problems associated with prior art fastener clips, the fastener clip 350 of the invention will provide reliable and safe installation and removal of the fastener clips 350 from crate panels.

The preferred embodiments of this invention have been disclosed, however, so that one of ordinary skill in the art would recognize that certain modifications would come within the scope of this invention.

What is claimed is:

1. A spring fastener clip for affixed crate panels together, the spring fastener clip comprising:
   a pair of spaced apart wire wall sections, each section having a panel bridging arm with two ends, a cleat bridging arm extending at an angle less than 90 degrees from a first end of the panel bridging arm, a first cleat end finger extending at an angle from a free end of the cleat bridging arm, and a second cleat end finger extending at an angle from a second end of the panel bridging arm;

a bridge section extending between each of the two first cleat end fingers; and an engagement pocket section extending between ends of the two second cleat end fingers that are not connected to the panel bridging arms, wherein the engagement pocket section at least partially extends rearwardly and downwardly from an imaginary vertical plane and horizontal plane that passes through the ends of the pair of second cleat end fingers, and wherein the engagement pocket provides an engagement for a prying tool that can be inserted into the engagement pocket when the spring fastener clip is in the process of and completely affixed to crate panels.

2. The spring fastener clip of claim 1, wherein the engagement pocket section comprises a V-shaped section of wire.

3. The spring fastener clip of claim 1, wherein the engagement pocket section comprises a semi-circular shaped section of wire.

4. The spring fastener clip of claim 1, wherein the engagement pocket section comprises a rectangular shaped section of wire.

5. The spring fastener clip of claim 1, wherein the pair of spaced apart wire wall sections are generally parallel to each other.

6. The spring fastener clip of claim 1, wherein the spring fastener clip is formed of a single piece of wire.

7. A spring fastener clip for affixed crate panels together, the spring fastener clip formed of a single piece of bent spring wire, the spring fastener clip comprising:

a pair of spaced apart panel bridging arms, each having two ends, a pair of cleat bridging arms, each cleat bridging arm extending at an angle less than 90 degrees from a first end of each of panel bridging arms, a pair of first cleat end fingers, each first cleat end finger extending at an angle from a free end of each of the cleat bridging arms, and a pair of second cleat end fingers, each second cleat end finger extending at an angle from the second ends of each of the panel bridging arms;

a bridge section that extends between ends of pair of first cleat end fingers not extending from the cleat bridging arms; and an engagement pocket section that extends between ends of the pair of second cleat end fingers not connected to the panel bridging arms, wherein the engagement pocket section at least partially extends rearwardly in the direction of the panel bridging arms and downwardly away from the cleat bridging arms, and wherein the engagement pocket section provides an engagement for a prying tool that can be inserted into the engagement pocket when the spring fastener clip is in the process of and completely affixed to crate panels.

8. The spring fastener clip of claim 7, wherein the panel bridging arms and the cleat bridging arms have a number 7-shaped contour.

9. The spring fastener clip of claim 7, wherein the pair of spaced apart panel bridging arms are generally parallel to each other.

10. The spring fastener clip of claim 7, wherein the engagement pocket section is selected from the group consisting of one of V-shaped section of wire, a semi-circular shaped section of wire, and a rectangular shaped section of wire.

\* \* \* \* \*